United States Patent [19]

Herrlander

[11] Patent Number: 4,514,196
[45] Date of Patent: Apr. 30, 1985

[54] ABSORPTION TOWER FOR GAS WASHING

[75] Inventor: Bo Herrlander, Växjö, Sweden

[73] Assignee: Flakt Aktiebolag, Nacka, Sweden

[21] Appl. No.: 492,357

[22] Filed: May 6, 1983

[30] Foreign Application Priority Data

May 10, 1982 [SE] Sweden .............................. 82029208

[51] Int. Cl.³ ............................................. B01D 47/10
[52] U.S. Cl. ........................................ 55/223; 55/226; 55/94; 261/116; 261/DIG. 54; 261/118
[58] Field of Search .................. 55/73, 89, 90, 94, 223, 55/235, 257 PP, 80, 93, 226, 238; 261/DIG. 54, 116, 118, 22, 115

[56] References Cited

U.S. PATENT DOCUMENTS

| | | | |
|---|---|---|---|
| 2,709,580 | 5/1955 | Kameya | 261/118 |
| 3,048,956 | 8/1962 | Lundy et al. | 55/235 |
| 3,122,594 | 2/1964 | Kielback | 55/90 |
| 3,131,041 | 4/1964 | Gupner | 55/235 |
| 3,490,204 | 1/1970 | Kalika | 261/22 |
| 3,517,485 | 6/1970 | Dell'Agnese et al. | 261/118 |
| 3,708,958 | 1/1973 | Duty et al. | 55/90 |
| 3,761,065 | 9/1973 | Rich | 261/116 X |
| 3,767,176 | 10/1973 | Engalitcheff et al. | 261/116 X |
| 3,811,249 | 5/1974 | Arnold et al. | 261/118 |
| 3,912,469 | 10/1975 | Ewan et al. | 261/116 X |
| 3,957,465 | 5/1976 | Pircon | 261/116 X |
| 4,104,041 | 8/1978 | Arita et al. | 261/116 |
| 4,210,428 | 7/1980 | Schneider et al. | 55/223 |
| 4,320,092 | 3/1982 | Kondo et al. | 261/116 X |

FOREIGN PATENT DOCUMENTS 0691170 2/1971 U.S.S.R. .............................. 55/233

Primary Examiner—Charles Hart
Attorney, Agent, or Firm—Dann, Dorfman, Herrell and Skillman

[57] ABSTRACT

The invention relates to an absorption tower (so-called scrubber) for gas washing in which the gas is introduced into the lower portion of the tower and flows upwards while making contact with a washing fluid. The tower (4) is provided with one or several washing stages (6–9), each comprising one or several venturi tubes (10) through which the gas is given a speed increase and the washing fluid is discharged through fluid nozzles (25) in the gas flow path. The venturi tubes in each washing stage are led through a common collecting baffle (11) for washing fluid which is then recirculated to the nozzles. Means (26,28,29) for liquid distribution are disposed in the upper portion of each venturi tube (10) and are arranged for fluid distribution in the gas flow in directions forming such angles to the vertical that the fluid flow will not fall backwards into the openings of the venturi tubes even if the gas flow through the tower is interrupted.

5 Claims, 6 Drawing Figures

U.S. Patent  Apr. 30, 1985  Sheet 1 of 2  4,514,196
Fig. 1
Fig. 2
Fig. 3
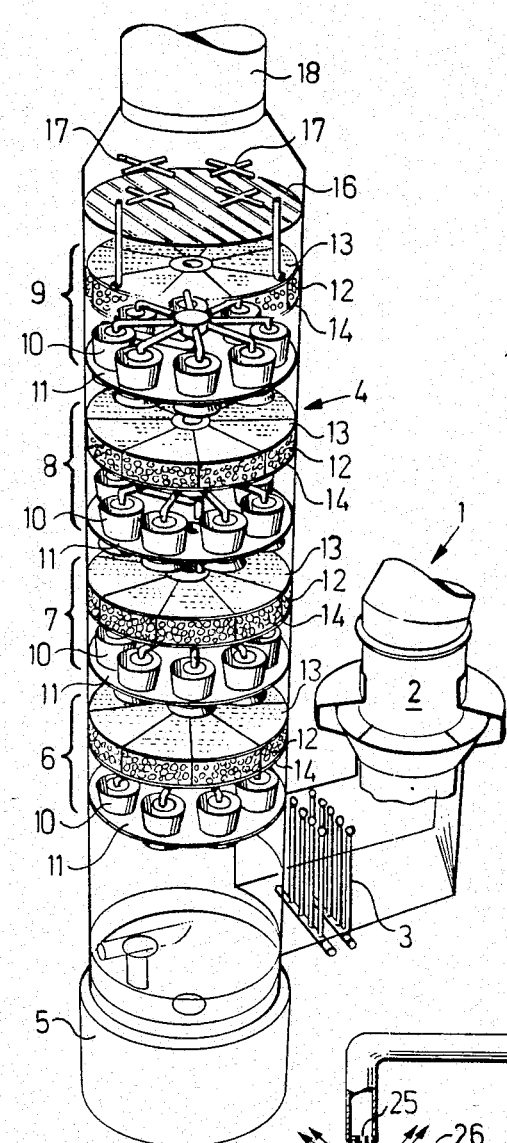
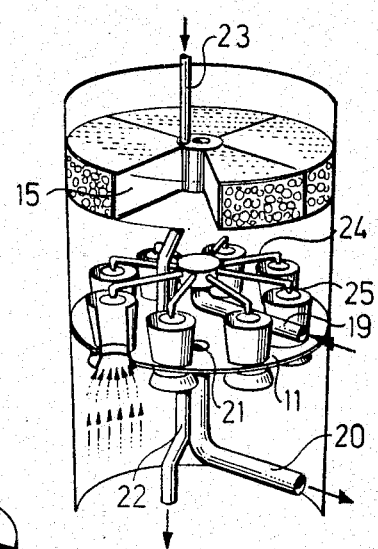
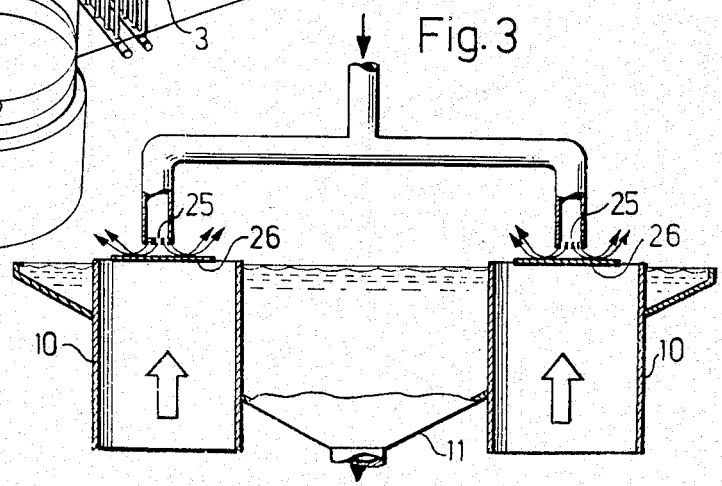

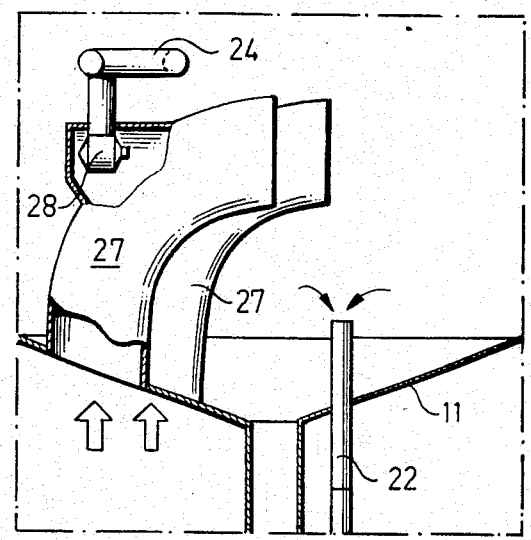
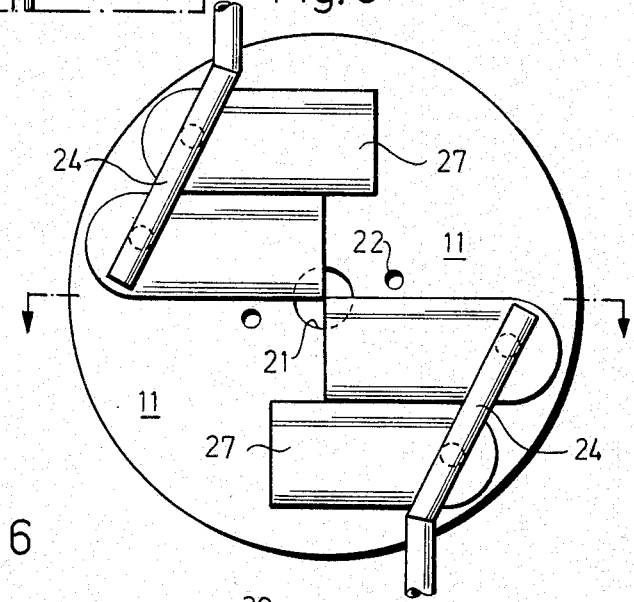
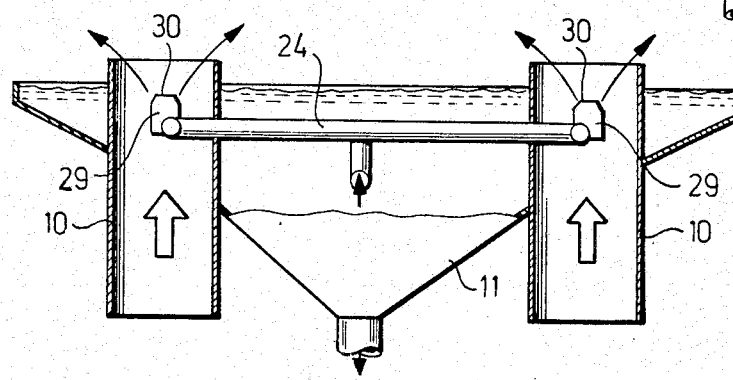

ABSORPTION TOWER FOR GAS WASHING

The present invention relates to an absorption tower for gas washing in which the gas is introduced into the lower part of the tower and flows upwards while making contact with a washing liquid. The tower is provided with one or several washing stages, each comprising one or several venturi tubes in which the gas is subjected to a speed increase, the washing liquid being discharged from fluid nozzles in the gas flow path, the venturi tubes in each stage being led through a common collecting baffle for the washing fluid which is then recirculated to the fluid nozzles.

An absorption tower of the kind mentioned above is commonly designated "scrubber" and is used within the cellulose industry to separate and recover sulphur dioxide in the flue gases from a black liquor boiler where evaporated heavy black liquor is burnt at high temperature. The absorption tower can suitably be designed as a "ball scrubber" comprising several stages through which the washing liquid is led from the uppermost and to the lowermost stage with internal circulation on each stage. A number of open centrifugal nozzles are spraying the gas upwards against a ball bed. The object of the ball beds is to increase the absorption transfer surface and to dewater the upwardly flowing mixture of gas and fluid. A self-cleaning action is obtained through the movement of the balls.

A common problem in scrubbers is that the gas flow through the scrubber can be subject to great variations and when the gas flow is low the washing fluid which is exhausted from the nozzles in the venturi tubes will fall backwards down into the openings of these venturi tubes. This will almost always have the effect that the scrubber stage is emptied of fluid which of course prevents further absorption. Such backward flow has of course specific disadvantages in multi-stage scrubbers when great amounts of liquid are often instantaneously lost through the outlet. In case a liquid with a certain quality should be produced such backward flow through the venturi will mean that the desired quality cannot be reached.

The objct of the present invention is to provide an absorption tower where the load, e.g. the gas through-flow, can vary from 100% to 0% without the disadvantage that the washing fluid from the nozzles will flow backwards down into the openings of the venturi tubes. With an absorption tower of conventional design it is only possible to change the load in the range of 100% to 60%.

This object is realized according to the invention substantially by the fact that means for fluid distribution are arranged in the upper portion of each venturi tube and are designed for fluid distribution with the gas flow in directions forming such angles to the vertical that the fluid flow will not be permitted to flow backwards into the opening of the venturi tube even if the gas flow through the tower is interrupted.

According to a suitable embodiment of the invention each venturi tube is designed with a bent upper portion, the outlet of which will give the exhausted gas a main flow direction forming a certain angle with the vertical, the fluid nozzles being disposed in said bent tube portion and adapted for liquid diffusion in substantially the same main direction as the gas flow.

Some embodiments of the invention will now be described with reference to the accompanying drawings, in which:

FIG. 1 is a transparent perspective view of an absorption tower where the washing fluid is introduced from above, FIG. 2 is a washing stage of the tower according to FIG. 1, FIG. 3 is a schematic side view of the nozzles with diffusion washers according to FIG. 2, FIG. 4 is a similar schematic side view as shown on FIG. 3 but with a alternative embodiment of nozzles and venturi tubes, FIG. 5 is a plan view of the alternative embodiment according to FIG. 4, and FIG. 6 is a schematic view similar to FIGS. 3 and 4 of a further alternative embodiment of the fluid nozzles.

The scrubber tower shown on FIGS. 1 and 2 comprises a ball scrubber with an inlet opening 1 for the flue gases which will pass through a cooler 2 and past a number of cooling nozzles 3. The tower itself 4 is supported on a rigid foundation 5 and comprises four washing stages 6-9, each including a number of venturi tubes 10 which pass through a common collecting baffle 11 for washing fluid. The gas flowing through the venturi tubes is sprayed upwards towards a ball bed 12 comprising balls similar to ping-pong balls which are kept within a restricted area between an upper net 13 and a lower net 14 between which the distance is sufficiently large to permit the balls to move substantially freely. The lower net 14 is somewhat inclined inwardly towards the center of the scrubber in order to permit a uniform movement of the balls. For the same reason each ball bed has been divided into several sections with transverse plates 15 (see FIG. 2). The object of the ball bed is to increase the absorption transfer surface in order to dewater the upwardly flowing mixture of gas and fluid. The absorption of sulphure dioxide ($SO_2$) is controlled through adjusting the pH in the different stages by addition of magnesium hydrate ($Mg(OH)_2$). A dewatering grating 16 is disposed in the upper portion of the tower and is intermittently flushed by means of special nozzles 17. The purified gas flow is then freely exhausted through an outflow 18.

As clearly appears from FIG. 2 washing fluid is introduced into each stage through an inflow 19 and is exhausted through an outflow 20. The funnel-shaped collecting baffle 11 will collect the fluid which is then led to the outflow conduit 20 through an opening 21 in the tip of the funnel. The excess fluid in this stage is flown to the underlying stage through an overflow conduit 22. In the same way, excess fluid from an overlying stage is flown through a conduit 23 to the stage shown in the Figure. The fluid introduced through the inflow conduit 19 is transferred to the different nozzle conduits 24 over a distribution manifold. Nozzles 25 are arranged at the ends of the nozzle conduits 24. In the embodiment shown on FIGS. 1 and 2 washing liquid is thus led from above through the nozzles 25 and towards a distribution washer 26 located at the opening of each venturi tube 10. The distribution washer is located substantially concentrically in the opening so that the distribution of fluid occurs upwards in directions which depart from the vertical. The distribution washer is moreover arranged at such distance from the opening that the distribution cannot be hindered by the inside of the venturi tube 10. Through this arrangement the liquid distributed upwards will not flow back into the upper openings of the venturi tubes even if the gas flow through the venturi tubes is interrupted.

The alternative design of venturi tubes 27 shown on FIG. 4 is provided with a bent upper portion which gives the exhausted gases a main direction having a certain angle to the vertical. The fluid nozzles 28 are recessed in the bent tube portion and are directed towards the opening of the venturi tube for permitting fluid distribution in substantially the same main direction as the gas flow. Thus, neither in this case the fluid will flow backwards into the openings of the venturi tubes if the gas flow is interrupted. The plan view of FIG. 5 discloses how the venturi tubes are arranged in pairs which are oppositely directed.

FIG. 6 is a further alternative embodiment with straight venturi tubes 10 giving the exhausted gases a substantially vertical flow direction. In the upper portion of the venturi tubes fluid nozzles 29 are arranged and provided with distribution portions for distributing the fluid in directions which depart from the flow direction of the gas and at such distances from the openinges of the tubes that the fluid distribution will not be hindered by the inside of the venturi tubes. Neither in this case fluid will flow backwards down into the exhaust openings of the venturi tubes even if the gas flow ceased or interrupted.

I claim:

1. An absorption tower for gas washing having upstanding walls defining a vertical flow passage in which the gas flows, a gas inlet in the lower portion of the tower, and an outlet at the top, so that the gas flows upwards through the passage while making contact with washing fluid, the tower being provided with at least two transverse baffles extending between the walls to prevent downward flow of washing liquid in the tower through or past the baffles to define at least two washing stages, each stage comprising at least one restricted tube extending upright through the baffle through which the gas is subjected to a speed increase, supply means including a fluid nozzle in the gas flow path for discharging washing fluid into the gas exhausted from the restricted tube, any fluid which is not entrained in the upwardly flowing gas passing through the gas and onto the baffle, the tube in each washing stage projecting above the baffle at a height to cause the baffle to collect a body of the washing fluid on the baffle, and drain means to discharge the washing fluid from the body of fluid on the baffle and a conduit to recirculate the washing fluid from the baffle to the fluid nozzle, said supply means being positioned adjacent the upper portion of said tube and constructed and arranged to discharge the recirculated washing fluid into the exhausted gas substantially concurrently therewith and in directions forming angles to the vertical, at least the major portion of said fluid discharge being at such angle and at such velocity that the fluid passes past the top opening of the tube into the collecting baffle and will not be permitted to flow backwards into the opening of the tube even if the gas flow through the tower is interrupted.

2. An absorption tower according to claim 1, wherein the tube has a bent upper portion with an exhaust opening which gives said exhausted gases a main direction forming an angle to the vertical, and the fluid supply means is disposed in the bent portion of the tube and the combination of the nozzle and the tube is constructed and arranged to discharge the washing fluid towards the opening of the tube in substantially the same main direction as the exhausted gas at an angle and velocity to cause the fluid to pass out past the opening even if the gas flow is interrupted.

3. Absorption tower according to claim 1, characterized in that the tube is straight with an upwardly-directed exhaust opening, and said exhausted gases flow in a substantially vertical direction and the fluid nozzle is disposed in the upper portion of the tube at the opening thereof and discharges the washing fluid upwards in directions which depart from the direction of the vertical flow.

4. An absorption tower according to claim 1, wherein the tube is straight with an upwardly-directed opening to exhaust said gas in a substantially vertical direction, and the fluid supply means comprise downwardly-directed nozzles for discharging fluid downwards and washers disposed substantially concentrically below said nozzles above the upper portion of the tube to intercept the flow from said nozzles and deflect the discharged washing fluid to cause said non-entrained fluid to flow concurrently with the gas at angles onto the collecting baffle without backward flow into the opening of the tube.

5. An absorption tower for gas washing in which the gas is introduced into the lower portion of the tower and flows upwards while making contact with washing fluid, the tower being provided with a plurality of washing stages, each stage comprising at least one tube through which the gasflows upwardly, the tube in each stage having an exhaust opening, fluid supply means in each stage including a fluid nozzle in the gas flow path for discharging washing fluid into the gas exhausted from the exhaust opening of said stage, a baffle in each stage for collecting the washing fluid which is not entrained in the upward gas flow, said baffle extending between the tower wall and the tube to collect the washing fluid and prevent downward flow of washing liquid in the tower past the baffle, said exhaust opening being above the baffle to permit said washing fluid to collect as a body of fluid on the baffle, drain means in the baffle to discharge fluid from said body, and conduit means to recirculate the washing fluid from the drain means to the fluid nozzle in the same washing stage, characterized in that said supply means is arranged adjacent the exhaust opening of each tube so as to discharge at least a major portion of said washing fluid into the exhausted gas substantially concurrently therewith in directions forming such angles to the vertical and at such velocity that the fluid which is not entrained in the upward gas flow passes into the collecting baffle and does not flow backwards into the exhaust opening even if the gas flow through the tower is interrupted, whereby each stage in the tower maintains recirculation of the washing fluid in the stage.

* * * * *